United States Patent
Colwell et al.

(10) Patent No.: US 10,628,546 B1
(45) Date of Patent: Apr. 21, 2020

(54) METHOD AND SYSTEM FOR AUTOMATICALLY EXTRACTING LAYOUT DESIGN PATTERNS FOR CUSTOM LAYOUT DESIGN REUSE THROUGH INTERACTIVE RECOMMENDATIONS

(71) Applicant: Cadence Design Systems, Inc., San Jose, CA (US)

(72) Inventors: Regis Colwell, Gibsonia, PA (US); Wangyang Zhang, Allison Park, PA (US); Elias L. Fallon, Allison Park, PA (US); David White, San Jose, CA (US); Jose A. Martinez, Pittsburgh, PA (US); Rong Chang Yan, New Kensington, PA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 16/024,481

(22) Filed: Jun. 29, 2018

(51) Int. Cl.
*G06F 17/50* (2006.01)
*G06N 5/04* (2006.01)
*G06N 20/00* (2019.01)

(52) U.S. Cl.
CPC ........... *G06F 17/5072* (2013.01); *G06N 5/04* (2013.01); *G06N 20/00* (2019.01); *G06F 2217/12* (2013.01)

(58) Field of Classification Search
CPC . G06F 17/5072; G06F 2217/12; G06N 20/00; G06N 5/04
See application file for complete search history.

(56) References Cited

U.S. PATENT DOCUMENTS

| | | | | |
|---|---|---|---|---|
| 7,117,460 B2* | 10/2006 | Chang | ................. | G06F 17/5036 716/115 |
| 7,673,278 B2* | 3/2010 | Rathsack | ................ | H01L 22/20 716/56 |
| 7,735,036 B2* | 6/2010 | Dennison | ............ | G06F 17/5045 716/106 |
| 8,155,943 B2* | 4/2012 | Nasle | .................. | G06F 17/5009 700/291 |
| 9,984,133 B2* | 5/2018 | Cervelli | ................ | G06F 16/252 |
| 10,061,300 B1* | 8/2018 | Coffman | ............ | G05B 19/4097 |
| 10,102,320 B2* | 10/2018 | Pataky | ................ | G06F 17/5022 |
| 10,289,788 B1* | 5/2019 | Kumar | ................ | G06F 17/5072 |
| 2006/0253810 A1* | 11/2006 | Guardiani | ........... | G06F 17/5068 716/54 |
| 2012/0030647 A1 | 2/2012 | Wang et al. | | |
| 2015/0213407 A1* | 7/2015 | Cabler | ................. | G06Q 10/101 705/300 |
| 2016/0110369 A1* | 4/2016 | Cervelli | ................ | G06F 16/252 707/722 |
| 2016/0253445 A1* | 9/2016 | Pataky | ................. | G06F 17/505 716/104 |
| 2017/0169340 A1 | 6/2017 | Asente et al. | | |

(Continued)

OTHER PUBLICATIONS

Non-Final Office Action dated Nov. 5, 2019 for U.S. Appl. No. 16/024,495.

*Primary Examiner* — Naum Levin
(74) *Attorney, Agent, or Firm* — Vista IP Law Group, LLP

(57) ABSTRACT

Disclosed are method(s), system(s), and article(s) of manufacture for implementing layouts for an electronic design using machine learning, where users re-use patterns of layouts that have been previously implemented, and those previous patterns are applied to create recommendations in new situations.

20 Claims, 11 Drawing Sheets

(56) References Cited

U.S. PATENT DOCUMENTS

2018/0046926 A1  2/2018  Achin et al.
2018/0060738 A1  3/2018  Achin et al.
2019/0211475 A1* 7/2019  Ito .......................... C40B 40/02

* cited by examiner

METHOD AND SYSTEM FOR AUTOMATICALLY EXTRACTING LAYOUT DESIGN PATTERNS FOR CUSTOM LAYOUT DESIGN REUSE THROUGH INTERACTIVE RECOMMENDATIONS

BACKGROUND

A semiconductor integrated circuit (IC) has a large number of electronic components, such as transistors, logic gates, diodes, wires, etc., that are fabricated by forming layers of different materials and of different geometric shapes on various regions of a silicon wafer. The design of an integrated circuit transforms a circuit description into a geometric description called a layout. The process of converting specifications of an integrated circuit into a layout is called the physical design.

Chip designers often use electronic design automation (EDA) software tools to assist in the design process. Chip design using EDA software tools generally involves an iterative process whereby the chip design is gradually perfected. A top-down design methodology is commonly employed using hardware description languages (HDLs), such as Verilog or VHDL for example, by which the designer creates an integrated circuit by hierarchically defining functional components of the circuit, and then decomposing each component into smaller and smaller components.

The various components of an integrated circuit are initially defined by their functional operations and relevant inputs and outputs. From the HDL or other high level description, the actual logic cell implementation is typically determined by logic synthesis, which converts the functional description of the circuit into a specific circuit implementation. The logic cells are then "placed" (e.g., given specific coordinate locations in the circuit layout) and "routed" (e.g., wired or connected together according to the designer's circuit definitions). The placement and routing software routines generally accept as their input a flattened netlist that has been generated by the logic synthesis process. This flattened netlist identifies the specific logic cell instances from a target standard cell library, and describes the specific cell-to-cell connectivity.

In the area of custom designs, the user can directly and interactively conduct placement and routing in a manual approach, e.g., by manually manipulating the location of objects. In addition, after an initial placement/routing process that may have undergone either auto-placement or interactive placement, the layout may still undergo additional interactive changes to the existing placement of objects, by potentially inserting or moving objects in portions of the layout.

Modern designs are becoming ever more complicated with huge numbers of objects and components that must be placed on a layout, combined with the issue of making sure the placement of the large number of objects/components do not get placed in configurations that will cause design rule violations or otherwise create performance problems. The problem is that with the huge number of design decisions that must be made by a designer for these complex circuit designs, it is becoming more and more difficult to achieve an acceptable design within a reasonable amount of time and resources. As integrated circuit manufacturing technology advances, greater complexities and more required resources are needed to design on each new process. Moving from one process node to the next can be anywhere from $2x$-$4x$ hit in productivity.

Advances in EDA tools to close this gap achieve the most success when mundane tasks can be automated. When automating tasks in EDA tools, tool makers commonly implement 'one size fits all' solutions based upon heuristics and/or provide user-controlled options to control the design process. However, heuristics are error-prone and an explosion of options makes their controls relatively unusable to users. Therefore, conventional tools either (a) burden the user by requiring the user to explicitly set options, provide descriptions, or write code to achieve the automation needed, or (b) follow heuristics that in many cases do not satisfy even a majority of users.

Previous attempts to improve productivity in custom semiconductor layout, especially analog layout, have relied on the user performing additional work to somehow abstract key concepts (e.g., Modgen scripts, Constraints, higher-level PCells) in the creation of key layout blocks. While these techniques may achieve an acceptable design, they often require layout designers to perform work above and beyond just the creation of layout, which is the main skill comfort area for such layout designers.

Therefore, there is a need for an improved approach to implement placement to address at least the aforementioned shortfalls of conventional approaches.

SUMMARY

Disclosed are method(s), system(s), and article(s) of manufacture for implementing layouts for an electronic design using machine learning. In some embodiments, the inventive concepts pertains to a system where users re-use patterns of layouts that have been previously implemented, and those previous patterns are applied to create recommendations in new situations. This is accomplished without additional work to setup or drive previous custom automation tools. This approach overcomes the most significant barrier to entry of most tools trying to improve the productivity of custom design.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

As previously noted, earlier attempts to improve productivity in custom semiconductor layouts have relied on the user performing additional work to somehow abstract key concepts for the layout. The key limitation with these known approaches is that essentially all the functionality to allow users to re-use common patterns of layout and design require users to spend effort abstracting those common patterns and specifying them in ways specific to each tool.

The present disclosure is directed to an approach that provides an improved solution. In some embodiments, the inventive concepts pertain to a system where users re-use patterns of layouts that have been previously implemented, and those previous patterns are applied to create recommendations in new situations. This is accomplished without additional work to setup or drive previous custom automation tools. This approach overcomes the most significant barrier to entry of most tools trying to improve the productivity of custom design.

Figure 1A:
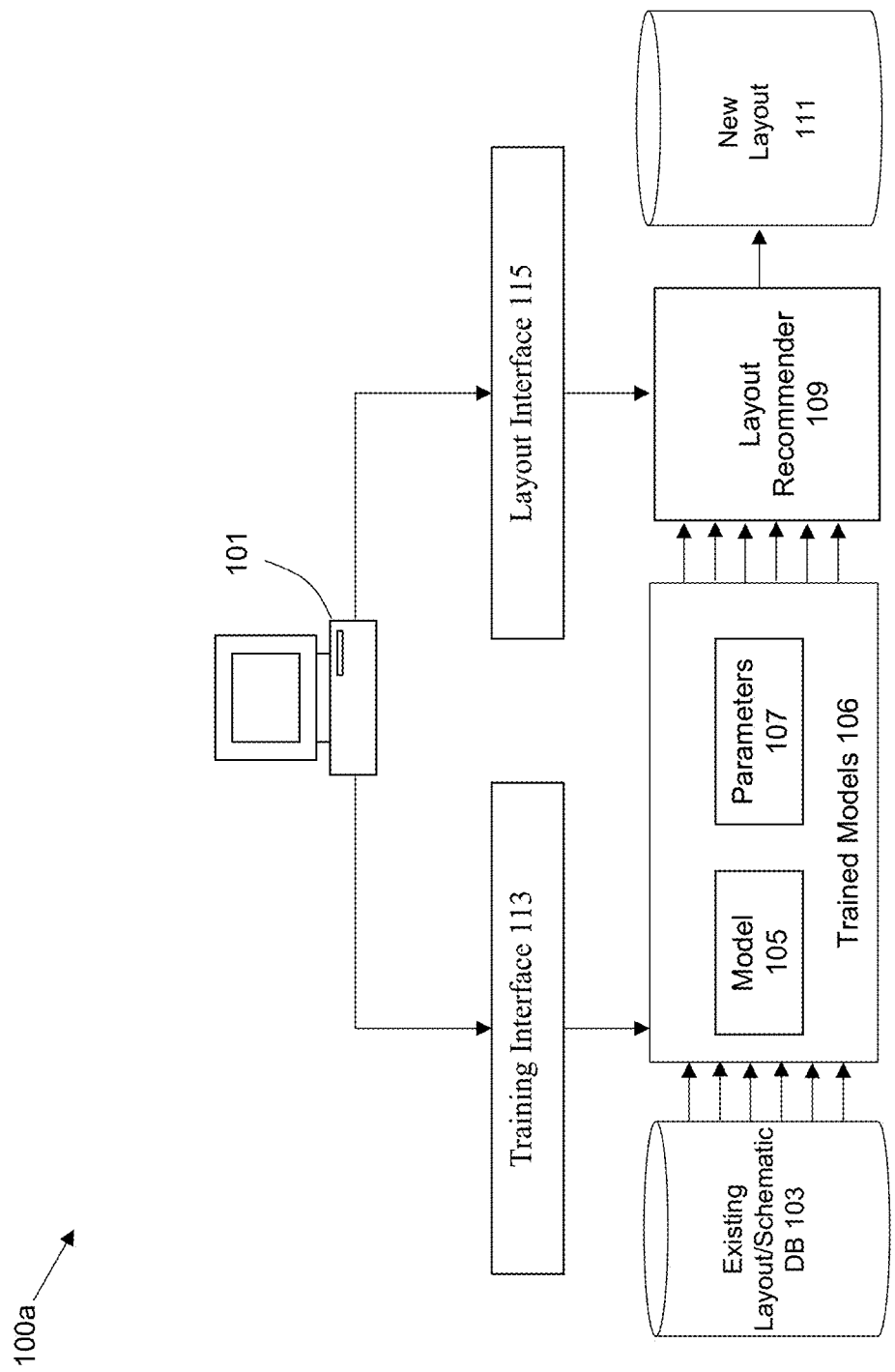
FIGS. 1A-B illustrate example systems which may be employed in some embodiments of the invention.

FIG. 1A illustrates an example system 100a which may be employed in some embodiments of the invention. System 100a includes one or more users that interface with and operate a computing system to control and/or interact with system 100a using a computing station 101. Such users include, for example, electronic designers and engineers. The computing system 101 comprises any type of computing station that may be used to operate, interface with, or implement one or more EDA systems/applications. Examples of such computing systems include for example, servers, workstations, personal computers, or remote computing terminals connected to a networked or cloud-based computing platform. The computing system may comprise one or more input devices for the user to provide operational control over the activities of the system 100a, such as a mouse or keyboard to manipulate a pointing object.

In system 100a, a consideration is made that the requirements of a first user for a layout may be different from the requirements of a second user. The key to this consideration is the observation that there are often multiple possible answers for each layout problem, and often the tradeoff between different answers depends on factors that are unobservable by the software. For example, two layouts of a differential pair may be equivalently: (a) DRC and LVS correct; (b) with an extracted view and a given set of test benches (i.e. they may perform the same by the defined measurements); (c) similar area, wirelength, and upper-level routability metrics.

However, User A may generally prefer one option over the other while User B has the opposite preference. The unobservable factors driving those preferences may be as simple as past experience or comfort levels based on past designs completed or knowledge of other design factors not captured in any part of the system today. Therefore, embodiments of the invention provide a set of predictors that are individualized for a given user, where the predictor(s) for a first user may provide a different set of recommendations from the predictor(s) for a second user.

In the approach of FIG. 1A, the individuated predictors are formed by having each user utilize that user's own historical set of designs to form individualized models for learning purposes. In effect, the historical design data 103 for user A will be used to generate a first individually trained model 106 for user A, while the historical design data for user B will be used to generate a second (separate) model for user B. As discussed in more detail below, this approach is in contrast to the approach of FIG. 1B, where a common/generic set of training data is used to form a generic partially-trained model.

Therefore, the inventive system includes a training system that is employed to generate one or more Machine Learning (ML) models 106. These ML models 106 pertain to various aspects of EDA design activities based at least on part upon existing schematics and layouts 103. Any suitable type of training may be applied to generate models 106. For example, "supervised training" is a type of ML training approach that infers a function from labeled training data. The supervised learning algorithm analyzes the training data and produces an inferred function, which can be used for mapping new examples. The training data may include, for example, historical designs that have already been created for the placement of objects and instances in previous layouts. Examples of such objects/instances include, for example, individual devices, device chains, multi-row groups of devices (e.g., a FigGroup/Modgen), custom cells, I/O pins, filler cells, and/or standard cells. A FigGroup is a grouping of circuit components used within certain applications, such as the Open Access database. A Modgen is an approach to group together block(s) of circuit components. The creation of certain groups creates a corresponding physical hierarchy in the layout, whereas other types of groups may create a logical hierarchy which may be further solidified into a physical hierarchy if the grouping is what a designer desires. It should be noted that the terms "blocks," "cells," "groups," "FigGroups," "fig_groups", and "Modgen" may in certain circumstances be used interchangeably throughout this disclosure, unless otherwise specifically recited or distinguished. As discussed in more detail below, in some embodiments the design layout may be implemented in a row-based approach, where the objects are placed within row-based constructs/templates.

The trained models 106 are used to generate individualized predictors for the users of the system. Each predictor corresponds to a trained model 106 that was previously generated for a given topic of interest. That trained model 106 is formed by a combination of a model 105 that is employed in tandem with a set of user specific model parameters 107 for that topic/model of interest. In some respects, the model 105 can be considered the "hypothesis" and the parameters as the tailoring of the hypothesis to a specific se of data. Therefore, the model parameters correspond to learned attributes for the specific topics of interest. For example, the model parameters may include a set of statistical values for different levels/nodes of a computational network (e.g., neural or Bayesian network). The layout recommender 109 receives schematics/layouts 111 from the user, and will use the predictors to generate a set of layout recommendations.

Various interfaces may be provided to control the operation of the system 100a. For example, a training interface 113 may be employed to control the operations of the training process, e.g., for selection and/or validation of training data. The layout interface 115 may be employed to control the operations of generating a recommended layout. As discussed in more detail below, this interface may be used to provide user input to accept or not accept certain suggestions made during the layout generation process.

Figure 1B:
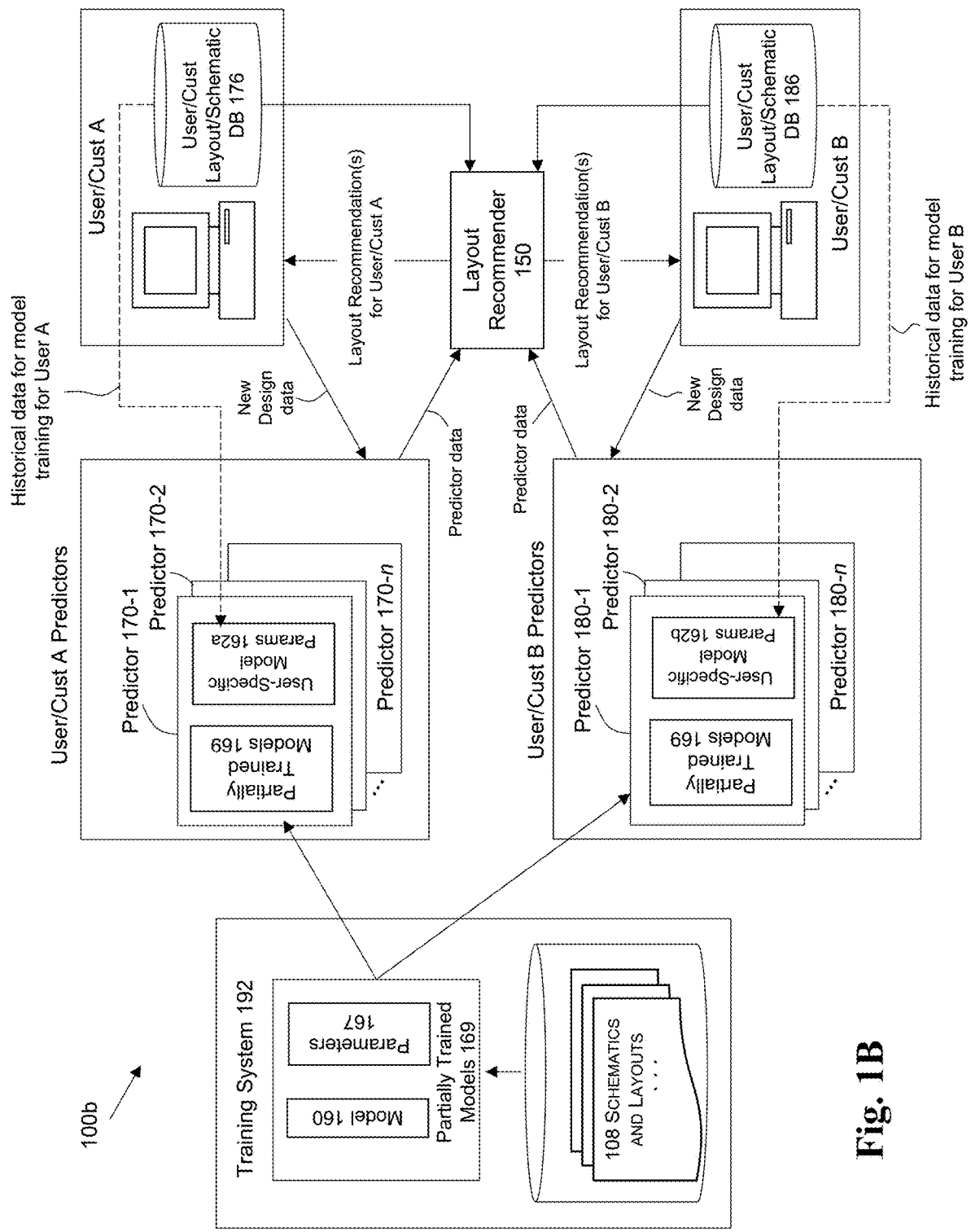

FIG. 1B illustrates an alternate system 100b which may be employed in some embodiments of the invention. The embodiment of system 100b provides an alternative approach to address the consideration that the layout requirements of a first user may be different from the requirements of a second user. The general idea is that in the approach of FIG. 1B, a common set of historical schematics/layouts 108 are employed for multiple users to generate a generic set of partially-trained models 169 that can then be used by the multiple different users to generate fully-trained models that are specific to each of the individual users. This is quite different from the approach of FIG. 1A, where each user's own historical data is employed from the beginning to generate user-specific models that are individualized for that user.

The partially-trained models 169, despite being generic, are used to generate individualized trained models for the predictors for each of the separate users, such as user A and user B, respectively. As illustrated in the figure, a first set of predictors 170-1, 170-2, through 170-n are created that are individualized for a first user, while a second set of predictors 180-1, 180-2, through 180-n are created that are individualized for a second user.

Each predictor corresponds to the generic partially-trained model 169 that was previously generated for a given topic of interest, which are used to generate fully-trained models based upon the users' specific model parameters. As such, the specific model parameters 162a is used in combination with generic partially-trained model 169 to generate fully-trained models for user A, e.g., where user A's specific model parameters 162a are generated from user A's historical layouts/schematics 176. For example, model parameters 162a may include a set of statistical values for different levels/nodes of a computational network (e.g., neural or Bayesian network) associated with user A. The model parameters 162a specific to user A combined with the partially-trained model 169 forms a fully-trained model that underlies a custom predictor 170-1 that performs predictions specific to the first user A. Similarly, a fully-trained trained model for user B is generated from the generic partially-trained model 169 using user B's specific model parameters 162b that were derived from user B's layouts/schematics 186. User B's model parameters 162b may include a set of statistical values for levels/nodes of the computational network associated with the second user, where the model parameters 162b specific to user B is combined with partially-trained model 169 to form a fully-trained model that corresponds to a custom predictor 180-1 that performs predictions specific to the second user B. The fully-trained models for user A are therefore different from the fully-trained models for user B, despite the fact that they both originate from the same set of partially-trained models 169. This means that the predictor 170-1 for user A may generate predictions that differ from the predictions generated by predictor 180-1.

The layout recommender 150 will receive schematics/layouts from the users/customers for new designs, and will use the predictors to generate a set of layout recommendations for each user. For example, for user A, the layout recommender receives layout data/schematics from user A's database (DB) 176, and employs user A's predictors 170 to generate layout recommendations specific to user A. For user B, the layout recommender receives layout data/schematics from user B's DB 186, and employs user B's predictors 180 to generate layout recommendations specific to user B.

The advantage of the FIG. 1A approach over the FIG. 1B approach is that the models are tuned for the individual user from the very beginning, so that more accurate predictions may be generated right away for the user of interest. The disadvantage with this approach is the challenge of being able to derive enough data from the model if the user does not have a sufficient amount of historical database of past designs to generate an accurate model.

The advantage of the FIG. 1B approach over the FIG. 1A approach is that an EDA provider of the layout tool can use a generic database of designs to provide a "starting point" for the training process for different users—even without gaining any access to the design trade secrets of its customers or even if the user does not have any/enough historical data that can be used. Those customers can then take that starting point generic model, and complete the model training using the user's own specific parameters for the fully-trained models to generate the individualized predictors. In addition, it is possible that the generic model may include industry best practices that the user itself was not previously aware of, and hence result in better results compared to less-optimal practices that exist in the user's own historical designs. The disadvantage of this approach is that if the user does have a usable database of historical data, then the training data extracted from the user's own data is likely to be much more accurate than training data extracted from a generic set of data.

As was discussed above, one of the issues pertaining to problems of existing EDA tools based upon heuristics is that in many cases; the heuristics do not satisfy even a majority of users. One cause of this problem is customer reluctance to share details of their underlying technology. This results in customers asking for specific features rather than providing full requirements. As an example, a customer may ask for a feature to align two structures automatically but not share the reason. In the end this practice could lead to a scenario where the EDA tools ends up implementing many options on this auto alignment that the customer must manually set (rather than being automated). With the present approach, the correct layout can be automatically achieved, even if the customer of the EDA tool does not choose to share the customer's design details. The customer preferences will be considered as part of the parameters that are used to generate the predictors, which will generally reflect the customer's preference among the possible layout possibilities, which will take into account the solutions similar to past designs that were done in a similar manner.

Therefore, these approaches to using Machine Learning techniques tunes the systems recommendations to the types of styles the specific user/customer uses. Given the unobserved factors, this invention tunes itself to recommend similar layout patterns from what the user did before, rather than requiring the user to specify additional options/scripts/parameters to drive that matching.

These approaches to applying Machine Learning to Electronic Design Automation problems has hitherto not been employed in known EDA systems. Known approaches are focused on simulation and modelling, where ML techniques take slow operations, such as running a field solver on many complex layout configurations, and create a model which can find the same answer much faster. However, conventional ML approaches do not apply machine learning techniques to implement recommendation engines on EDA techniques, as disclosed in the present embodiments.

Figure 2:
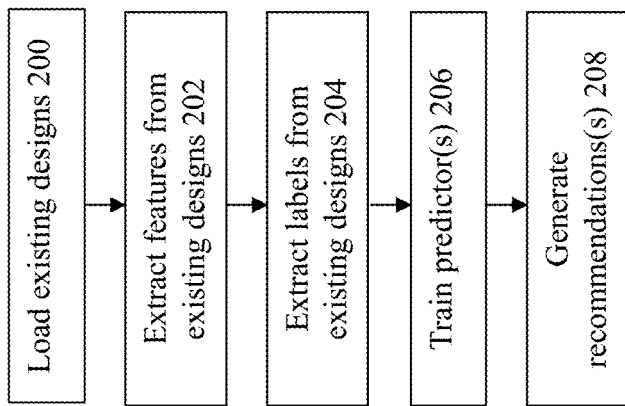
FIG. 2 illustrates a flowchart of an approach to implement embodiments of the invention.

FIG. 2 shows a flowchart of an approach to implement embodiments of the invention. At 200, one or more existing designs are loaded to a design database. The existing designs may include schematics and/or layout for previous designs. For supervised machine learning applications, the designs to be loaded are selected from designs that have been found to be acceptable for use as training data.

At 202, a plurality of features are extracted from design(s), where variable selection and/or attribute selection is performed. This step is performed to select the relevant set of features that are identified for model construction. Any suitable approach may be employed to perform feature extraction, e.g., filter methods, wrapper methods, and/or embedded methods. For example, filter methods may be performed to reduce the overall amount of data within the model by determining the features which may statistically affect predictive/historical outcomes, where a statistical measure is employed to assign a scoring to each feature and the features are ranked by the score and either selected to be kept or removed from the dataset. Examples of filter methods that may be employed include the Chi squared test, information gain, and/or correlation coefficient scores.

At 204, labels may be extracted from the existing designs. The models are trained by a combination of the training set and the training labels, where the labels often correlate to data for which a target answer is already known. With supervised machine learning, the predictive algorithms teach themselves from the labeled examples that are provided.

At 206, the individualized predictors are trained. As noted above, the predictors are trained by a combination of the models with the user-specific labels and features extracted above, providedby a given user/customer.

Thereafter, at 208, one or more recommendations may be generated for a given user/customer. As previously noted, a layout recommender receives schematics/layouts from the customers, and will use the predictors to generate a set of layout recommendations for each user.

Illustrative Embodiment

This portion of the disclosure will now discuss an illustrative embodiment of the invention that is applied to implement layouts for row-based electronic designs. A brief overview of row-based designs will be provided, followed by illustrative approaches to extract features/labels for row-based designs, training of predictors for row-based designs, followed by an approach to generate recommendations for row-based designs. It is noted that while the disclosure provides an illustrative example pertaining to row-based designs, the inventive concepts disclosed herein are not limited in their scope only to row-based designs, and indeed, are applicable to numerous other types of designs as well, and hence the scope of the invention is not restricted to row-based designs unless claimed as such.

Row-Based Electronic Designs

Modern integrated circuit designs allow certain specific arrangements of devices (e.g., N-P-P-N or P-N-N-P arrangements of transistors). These devices in these specific arrangements of devices may have different heights, different structures, and/or different spacing values in between. On the other hand, conventional placement tools only allow placement of standard cells having the same height. In addition, conventional approaches require intensive computational resources as well as human efforts to manually arrange devices having different height values during placement. In an example including devices having different height values, a placement tool may iterate through a plurality of processing with extensive inputs and manipulations by a designer to place these devices.

For example, a placement tool may arrange these devices in a certain pattern but to subsequently find that the pattern violates certain rules or requirements and thus does not result in a legal placement layout or floorplan. Examples of such violations may include a determination that the pattern is not permitted by some manufacturing requirements, a device in the pattern being placed in a prohibited orientation or a device being placed in a location that does not align one or more grids (e.g., poly grids for polysilicon gates, fin grids for multi-gate devices, etc.) of the device (e.g., an instance of a cell) with the one or more corresponding grids defined for the placement layout or floorplan. Other examples of such violations may include a device being placed at a location that fails to observe the site definition (e.g., siteDEF), In addition, a device may be placed at a location in one of multiple possible orientations where some or all of these multiple possible orientations lead to legal placement of the device. These multiple legal orientations, when coupled with the aforementioned alignment or positioning requirements, further complicate the placement. For example, a device may be placed in a first orientation at a location that results in illegal placement of the device in the placement layout or floorplan. Nonetheless, the same device may be placed in a second orientation at the same location that results in legal placement of the device. In this example, the illegal placement of the device may be fixed by simply rotating the device. Nonetheless, the alignment and/or positioning of the device, when coupled with the orientation, may cause the placement tool to waste much more computational resources by repeatedly trying different placement options before finally arriving at a legal placement result.

The problems of conventional approaches with requiring intensive computation is further exacerbated when a certain arrangement of devices is repeated in a portion of the placement layout. For example, in integrated circuit designs such as memory cells, a pattern or arrangement of devices may be repeated several times to fill a region in the layout. With the conventional approaches, an error in one pattern or arrangement needs to be fixed multiple times so that the repeated patterns or arrangements are legal.

These issues are even more problematic in advanced technology nodes (e.g., 14 nm and below) that permit only a limited number of legal track patterns and a number of permissible width values. A legal track pattern includes a plurality of routing tracks that are associated with a permissible combination of width values. For example, the advanced technology nodes may require that a routing track associated with 34 nm width cannot be located immediately adjacent to another routing track associated with a width value of 58 nm or greater. Placement tools thus need to address not only the aforementioned complexities but also conform to the limited number of legal track patterns.

To address shortcomings of conventional approaches for placing instances of standard cells and custom blocks in a placement layout or floorplan, various embodiments described herein identify a placement region or a place and route boundary in a layout canvas or a floorplan. An object may be created and stored in a data structure (e.g., a database) for the placement region or the place and route boundary as a "row region" in some embodiments. A row region may represent a geometric area of the layout or floorplan in the canvas and may be identified in a variety of different manners. For example, a user may specify a placement region or place and route region in a layout canvas or a floorplan, and an EDA module (e.g., a placement module) may create a row region representing the extent of the specified placement region or place and route region. The EDA module may also provide a default region that may be further customized or configured by a designer in some embodiments. In some embodiments, a row region may be created and stored as an object (e.g., a physical object) that is associated with, for example, its identifier, the extent of the placement region or placement and route region, etc. In some other embodiments, a row region may be created and stored as a reference that is also associated with the same information as does the object. The object or reference of a row region may be stored in a data structure (e.g., a list, a table, a database table, etc.) for subsequent reuse.

A row region may include a rectilinear shape having a plurality of vertices and boundary segments and thus may be stored in various different manners that are not intended to limit the scope of row regions. For example, a row region may be stored as a set of points each corresponding to a vertex of the rectilinear shape. As another example, a rectangular row region may be stored as a reference origin, a length value, and a width value. At this stage, a row region may simply be represented as the geometric area in the canvas with no rows created therein or characteristics associated therewith.

In some embodiments, one or more rows may be created by applying a row template to the row region, and one or more characteristics for each of the one or more rows may be stored in or associated with the one or more rows or the row region itself as described in more details below. Applying a row template to a row region creates one or more rows in the row region and associates the one or more rows with their respective characteristics, attributes, or configuration. In some embodiments where a row is created as an object, these characteristics, attributes, or configuration may be stored in the object. In some other embodiments where a row is created as a row reference, these characteristics, attributes, or configuration may be associated with the row reference. These respective characteristics, attributes, or configuration stored in or associated with each row may be subsequently queried by placement commands to determine one or more rows and/or one or more legal locations for placing an instance to create a legal placement layout or floorplan. One or more attributes, characteristics, or configurations specified in the row template for a row may be optionally customized. Customization may be made to the row template in some embodiments or to individual rows in some other embodiments. The customization to a row template may occur before or after a row template is applied to a row region. In some embodiments where the customization of a row template occurs after the application of the row template to a row region, one or more rows are generated in the row region based on the row template before customization and will thus be re-generated with the customized row template. It shall be noted that regeneration of rows after a row template is customized or modified may apply to all the rows generated with the non-customized row template in some embodiments or only to one or more rows whose attributes, characteristics, or configurations have been affected by the customization in some other embodiments. In some other embodiments where the customization of a row template occurs before the application of the row template to a row region, one or more rows are generated in the row region based on the already customized row template and will not be regenerated.

After the row template is applied to the row region, a placement module may issue one or more placement commands to place one or more instances into their respective rows in the row region as guided by the row template. As described above, a row may allow one or more specific types of circuit components or devices, and thus an instance of a specific type may not necessarily be inserted into any row in a row region. In some embodiments where instances are to be snapped to their respective legal locations in a row region in an automatic, interactive, or assisted placement task, the placement modules may leverage various snapping techniques.

The row-based design may correspond to one or more reference grids. A reference grid may be identified from the manufacturing grids that are often provided by the manufacturers (e.g., a foundry) and consists of both horizontal and vertical grids at a small spacing value (e.g., 1 or 2 nanometers) and may be used to position various entities (e.g., rows, layout circuit component designs, layout devices, cells, blocks, etc.) in a layout. In some embodiments, a reference grid in the horizontal direction (hereinafter reference Y grid) and a reference grid in the vertical direction (hereinafter reference X grid) may be identified. A reference grid includes a set of parallel reference lines or line segments at a spacing value that is larger than that of the manufacturing grids. An intersection of the reference X and reference Y grids may be identified as the relative origin for the placement region or place and route boundary. The reference X grid and reference Y grid may be independently identified from the manufacturing grids in some embodiments or may be identified from one or more sets of grids that may also be provided by the manufacturers in some other embodiments. For example, an integrated circuit (IC) manufacturer may provide a fin grid for multigate MOSFET (Metal-Oxide-Semiconductor Field-Effect Transistor) such as a FinFET (Fin Field Effect Transistor) or other non-planar or three-dimensional transistors, a poly grid for aligning polysilicon gates, a global fin grid, a global poly grid, etc. in one or both routing directions. The reference X grid and reference Y grid may be identified from one or more of the aforementioned grids in some embodiments. With the reference grids identified, the row region identified or created may be automatically snapped to the reference grids. For example, a vertex of the row region (e.g., the lower left vertex of a rectangular row region) may be snapped to the origin of the reference grids or to another intersection between the reference grids. Snapping the row region may or may not alter (e.g., enlarging, shrinking, or changing the shape) the geometries of the row region.

A row template may be identified from a repository, modified from an existing row template in the repository, or created anew. A plurality of characteristics, attributes, or configurations may be identified for the row region from the row templated identified or created. These characteristics, attributes, or configurations may include one or more of, for example, the number of rows in the row template, the reference grids, the positive or negative reference X grid offset, the positive or negative reference Y grid offset, the height of a row in the row template, one or more allowed types of circuit components or devices for a row in the row template, or one or more permissible orientations. These one or more permissible orientations may include, for example, horizontal, vertical, rotating by 0-degree (R0), 90-degree (R90), 180-degree (R180), or 270-degree (R270), mirroring against the reference X grid (MX), mirroring against the reference Y grid (MY), etc. of a circuit component or device when placed in a specific row. It shall be noted that the same circuit component or device may have identical or different orientation(s) when placed in different rows. A row template may include one or more rows. When a row template is applied to a row region, these one or more rows will be created in the row region. A row region on the other hand, may have a different height than the row template. A determination may be optionally made to decide how to fill the row region with the row template. When applying a row template to a row region, the entire rows or some but not all of the rows in the row template may be created in the row region. In some embodiments where the height of the row region is larger than that of the row template, the row template may be repeated an integral multiple of times to fill the row regions with the rows in the row template with the option of filling the remaining space in the row region, if any, with some but not all of the rows in the row template.

A placement command may be invoked by, for example, an interactive, assisted, or automatic placement to place the instance in the layout. When the row template is applied to the row region, one or more rows are created in the row region according to the row template, and characteristics, attributes, or configurations pertaining to these one or more rows are associated with or stored in the corresponding rows. The placement command may then query these characteristics, attributes, or configurations of the one or more rows created in the row region to obtain relevant information about these one or more rows. This relevant information in the query results may then be compared with the one or more instance characteristics identified to identify one or more candidate rows and/or one or more candidate locations. For example, a first row in the row region may allow only NMOS, and the second row may allow only PMOS. In determining a candidate row for placing a NMOS, a placement command may query both the first and second rows to identify the permissible device type characteristic and then select the first row as the candidate row. In some embodiments where more than one candidate row are identified, the placement command may insert the instance into the candidate row or the candidate location that is closest to the instance in an interactive placement mode where a designer may attempt to place the instance by dragging an instance into the layout. A candidate location is a legal location that satisfies one or more design rules so that placing the instance at the candidate location results in a legal placement layout. A candidate location may be determined based in part or in whole upon, for example, one or more grids, alignment requirements, track pattern rules, spacing rules, etc. For example, a legal location may be identified for an instance of a FinFET by identifying the legal location such that the fin grid in the FinFET instance is aligned with the FinFET in a candidate row, and various metal shapes of various widths in the FinFET will be located along their corresponding routing tracks in a legal track pattern in the candidate row. The placement command may then insert the instance into a candidate row or at a candidate location in a candidate row. The instance is inserted in such a way to satisfy pertinent characteristics, attributes, or configurations. For example, a candidate row may be associated with or may store therein alignment characteristic(s), alignment offset characteristic(s), permissible orientation(s), instance pitch, site definition, or any other characteristics, attributes, or configurations. The placement command may then orient the instance to satisfy the permissible orientation(s) and identify the legal position to satisfy the alignment, offset, instance pitch, or site definition.

Figure 3:
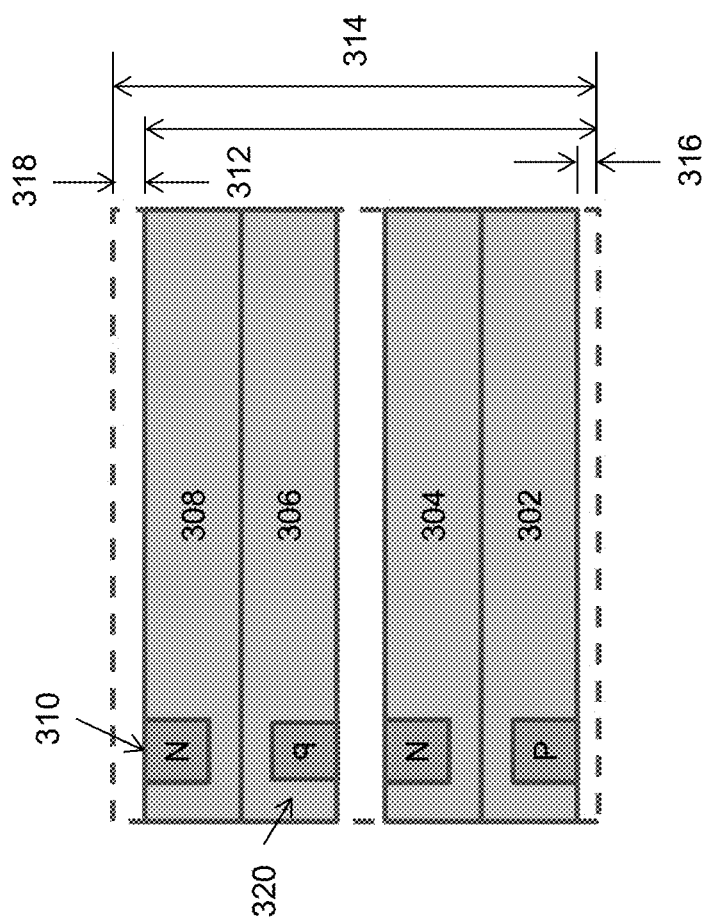
FIG. 3 illustrates a simplified example of rows and row templates in some embodiments.

FIG. 3 illustrates a simplified example of rows and row templates in some embodiments. This simplified example includes four rows—row 302, row 304, row 306, and row 308—within the template having a template height 314. Row 302 is specified in the row template at the row 302 offset 316 from the bottom of the row template. This row 302 offset 316 may again be used to specify the offset from the top of the row template when this template is repeated in a row region. As graphically indicated in this figure, each row may store or be associated with a permissible device type, permissible orientation, an alignment characteristic for devices to be placed in the row. In this illustrated example, the NMOS (N-type Metal-Oxide-Semiconductor) device 310 in row 308 is shown to be in the permissible orientation of R0 (rotation by zero degree); and the PMOS (P-type Metal-Oxide-Semiconductor) device 320 in row 306 is shown to be in the permissible orientation of R270 (MY—mirrored around the Y axis).).

Further details regarding approaches to implement a row-based design are described in co-pending U.S. patent application Ser. No. 15/396,156, U.S. patent application Ser. No. 15/396,178, and U.S. patent application Ser. No. 15/396,229, all filed on Dec. 30, 2016, and all of which are hereby incorporated by reference in their entirety.

Feature and Label Extraction

For training purposes, features and labels are extracted from existing designs into sets of numeric representations of those features. The features are extracted to select the relevant set of features that are identified for model construction. The labels are employed to identify and categorize content from within the training data. The models are trained by a combination of the training set and the training labels, where the labels often correlate to data for which a target answer is already known. With supervised machine learning, the predictive algorithms teach themselves from the labeled examples that are provided.

Conventionally, the actions of gathering, preprocessing, and labeling the test and training data can be arduous. Gathering requires finding the source of whatever data is required. Preprocessing can include operations such as removing 'bad' data, concerting all data to the same format or size, and similar operations that may be either scripted or performed manually by an engineer. Finally, labeling the data may be the most time consuming step in the process. Labeling is associating some known correct tag with the data such as "this is a picture of a cat" or "pixels in box XXX by YYY are known to be images of cancer. Such label is typically done in 2 ways. First an engineer can manually label the data. Secondly, unsupervised machine learning may be employed to divide the input data into similar sets and then the set reviewed for accuracy and given appropriate labels. Both ways are typically quite error prone and time consuming. Further, once labeled data is created, it is often not managed in any systematic way. For example, training and test images may simply reside on a Linux file system in directories indicating their labels and expected usage. The provenance including original source, preprocessing, how labeling was done are all lost and only the final data is stored. This can lead to a lack of accountability and trackability if any problems are found downstream in the system.

In conventional systems, the need for manual preprocessing and labeling of data is because, in many cases, the data has been acquired over time and in multiple formats. Further the formats may not be rich enough to store the labels with the data or the original capture of the data did not include the labels. In most extreme cases the unlabeled data could be sourced from film that has been digitized. The lack of management of the data could be caused by a few reasons. Firstly, there are not many industry hardened applications of machine learning and as such there may be little perceived value of such a solution in the current field of research. Machine learning itself presents enough technical challenges that something as apparently trivial as tracking the provenance of data may not be the most interesting problem that researchers or engineers face. Secondly, machine learning training and testing typically require large data. Storing original data as well as copies of data in all preprocessed steps would consume more storage space than the perceived value of this information.

Embodiments of the present invention solve these problems by using domain knowledge and information found in the database storing that placement to extract the active devices in the circuit design. Then, each layout device can be associated with a schematic device. Other information can also be used, such as connectivity found in the full schematic. Since the database storing the design information already has much information in addition to the final layout, this information can be used to construct features and labels for the machine learning problem. Further, since these existing schematic and layout databases are already using some form of version control, one can limit the amount of additional information needed to trace the history of where the labels and features originated.

Figure 4:
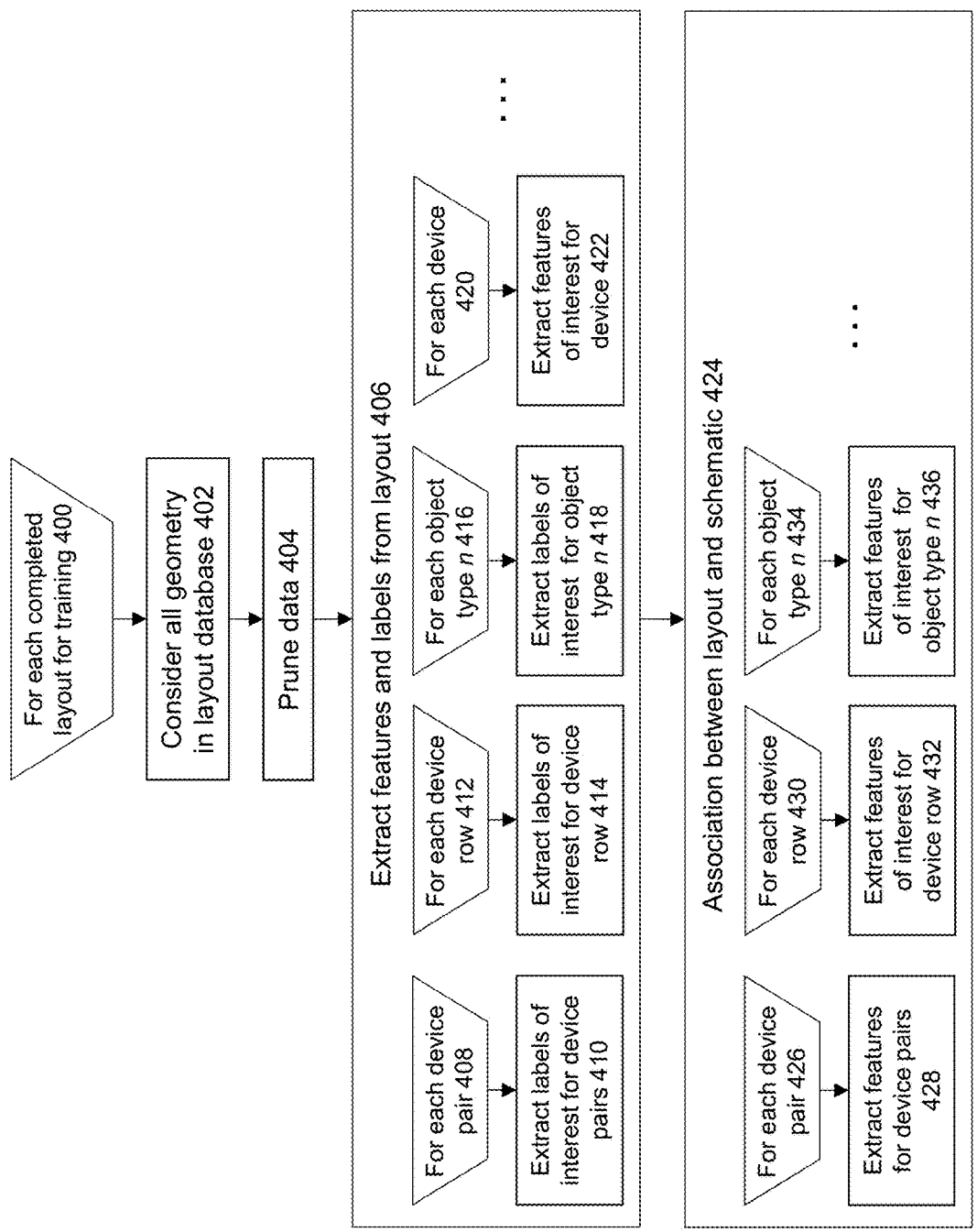
FIG. 4 shows an example flow chart for extracting features and labels from existing design data.

FIG. 4 shows an example flow chart for extracting features and labels from existing design data. The user input includes a list of completed layouts to extract information from, where in some embodiments this list is the only user input that is required. Each layout is visited, active devices located, and labels and features are extracted.

The process begins at 400, which identifies that the disclosed processing occurs for each layout to be trained upon. At 402, consideration is made of geometry for the layout. One or more electronic design databases may be accessed to retrieve the layout information, which include for example, geometric information regarding shapes for the objects placed onto a layout to implement a given electronic design.

At 404, pruning is applied to remove information that would be irrelevant or of little value to the training process. This action is taken because a layout may include significant amounts of non-active components that are added for manufacturing reasons, but which are not necessarily part of the "electronic" design. An example of design data that may be removed during the pruning step includes metal fill geometries, which are often also referred to as "dummy" fills. These are non-active shapes that are typically added to fill into open space within the layout that otherwise do not include active electronic components. The reason to add these filler shapes is because the process to manufacture ICs often run into yield and patterning problems if there are excessive open areas in the layout, and hence metal fill materials are added to increase metal densities to sufficient levels to avoid these types of yield problems.

Any suitable approach may be taken to identify dummy fill within the layout for pruning purposes. LVS (layout versus schematic) analysis may also be performed to identify metal fill, where shapes that exist in the layout but do not correspond to design objects in the schematic may correlate to metal fill. Another approach is to review the structure of objects in the layout, and to identify as metal fill any shapes that connect only to ground.

At 406, features/labels are extracted from the layout. The system extracts labels from existing EDA databases without any additional preprocessing, where the data is stored in a regular format and the system leverages common conventions used in the creation of custom layout. Further, existing versioning information for the design database can be used as a tag attached to the extracted features and labels and pushed through the entire system. At any point, one will be able to trace back to see what data was used for what machine learning training should there be a need to track this information or make incremental updates and rerun the system.

The information may be extracted at different levels of granularity. For example, at the level of the individual device, at 420, consideration is made for each device in the layout, where at 422, for each device, feature information may be extracted for that device (such as device size). For certain type of layout issues, there can be consideration of pairs of devices at 408, the level of granularity for pairs of devices is considered, where the information in the EDA database is used to extract information from all pairs of devices without further user intervention (e.g. relative location of devices). At 410, labels are extracted from the layout for each of the device pairs. At 412, consideration for rows of devices is made, where at 414, labels are extracted for the rows of devices. At 416, consideration is made for additional object types, where at 418, labels are extracted for the additional object types. This process may be repeated for other and additional levels of granularities and design elements, where consideration is made of these additional levels of granularities and design elements and labels are extracted for the additional design elements. Examples of additional elements for which labels may be extracted include groups of devices and full placements, depending on what input is needed for the ML processing.

At 424, associations between devices in the layout and schematic are used to augment the information with schematic information. Examples of feature information that may be extracted include the schematic position of the associated schematic device or the connectivity between the devices. Labels are extracted from the schematic, such as which devices are in proximity to each other in the schematic (e.g., to compare against device proximity in the layouts).

At 426, each device pair is considered, where at 428, feature information from all pairs of devices are extracted. At 430, each device row is considered, where at 432, feature information from all device rows are extracted. At 434, additional object types are considered, where at 436, feature information for the additional objects types are extracted. This process may be repeated for other levels of granularities and design elements, where association between a layout and a schematic may be performed for these other design elements.

Figure 5:
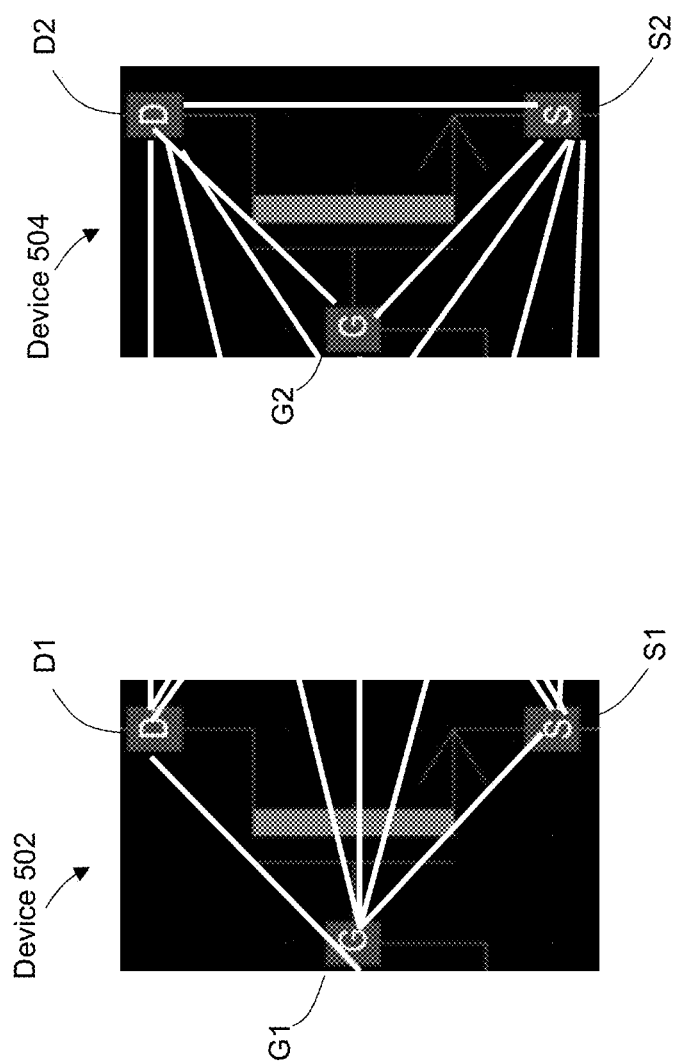
FIG. 5 illustrates an example pair of devices for which features information is extracted.

To illustrate this feature and label extraction process, consider the pair of devices (device 502 and 504) shown in FIG. 5. Here, examples of the types of features extracted include, given pairs of instances in a design: (1) Output a matrix representing the connectivity between the two instances; (2) If the two instances are the same type of device (generally: NMOS vs PMOS, and specifically:

NMOS High Voltage vs Low Voltage devices). The approach will also extract labels from those existing designs in sets of numeric representations of those labels. Examples of the types of labels extracted include, given pairs of instances in the completed layout: (1) Are the two instances in the same row; and (2) Do the two instances have the same orientation.

Examples of individual instance features that may be extracted include: (a) name, (b) row (label), (c) columns (label), (d) numFins, (e) numFingers, (f) length, (g) Schematic Position, (h) Schematic orientation, and/or (i) device type. Row labels may be determined by analyzing completed layouts in the design database.

Instance Pair Features may include for example, connectivity depending on if two terminals are connected in the EDA Database. Examples of connections are in FIG. 5, including: (a) D1-G1(Drain1-Gate1), D1-S1(Drain1-Source1), D1-D2(Drain1-Drain2), D1-G2(Drain1-Gate2), D1-S2(Drain1-Source2); (b) G1-S1, G1-D2, G1-G2, G1-S2; (c) S1-D2, S1-G2, S1-S2; (d) D2-G2, D2-S2; (e) G2-S2. Instance pair features may also include information about the relative positioning of devices, such as "Above/Below" and "Left-Right" information for a pair of devices that are computed from position in EDA Database.

Feature information may be extracted for a row, which are computed from rows in completed layout. An example of a row feature is information about whether the row is a first level routable in the row. Another example is information about whether there is a GuardRing above or below the row.

Illustrative Embodiment of a Predictor

The extracted features and labels are used to train predictors. The predictors are used in deployed systems to answer questions when creating new layout. This portion of the disclosure described an illustrative embodiment that is directed to implementation of a predictor to answer the specific question of: Should this pair of instances be placed in the same row?

Figure 6:
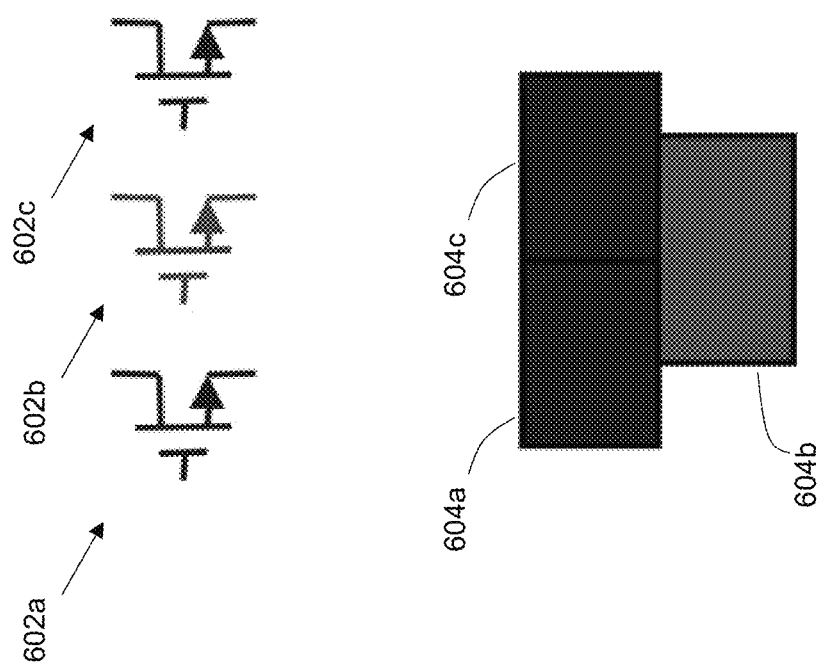
FIG. 6 illustrates an example pair of devices to place in a layout.

In the field of custom layouts for row-based FinFET designs, one of the most important decisions designers make in placement is which devices should be placed into the same row. FIG. 6 illustrates this problem. Here, the circuit includes devices 602a, 602b, and 602c (transistors) in a design schematic. The question is whether these devices in the schematic should be implemented within the same row in the layout. The machine learning approach of the present inventive embodiments can be employed to make this determination, e.g., to where devices 604a and 604c are placed on the same row of the layout while device 604b is placed on a different row.

This portion of the disclosure describes a machine learning approach that automatically learns from previous layout data how designers make decision about whether two devices should be placed in the same row. Decisions from this system can be later combined to form the actual rows. Some embodiments operate by: (1) Performing a nonlinear transformation to the features, so that the machine learning algorithm can more easily learn from these features (2) A decision-tree based machine learning approach that automatically mimics how people actually make the decision based on these features. A detailed description of the approach is provided below.

Figure 7:
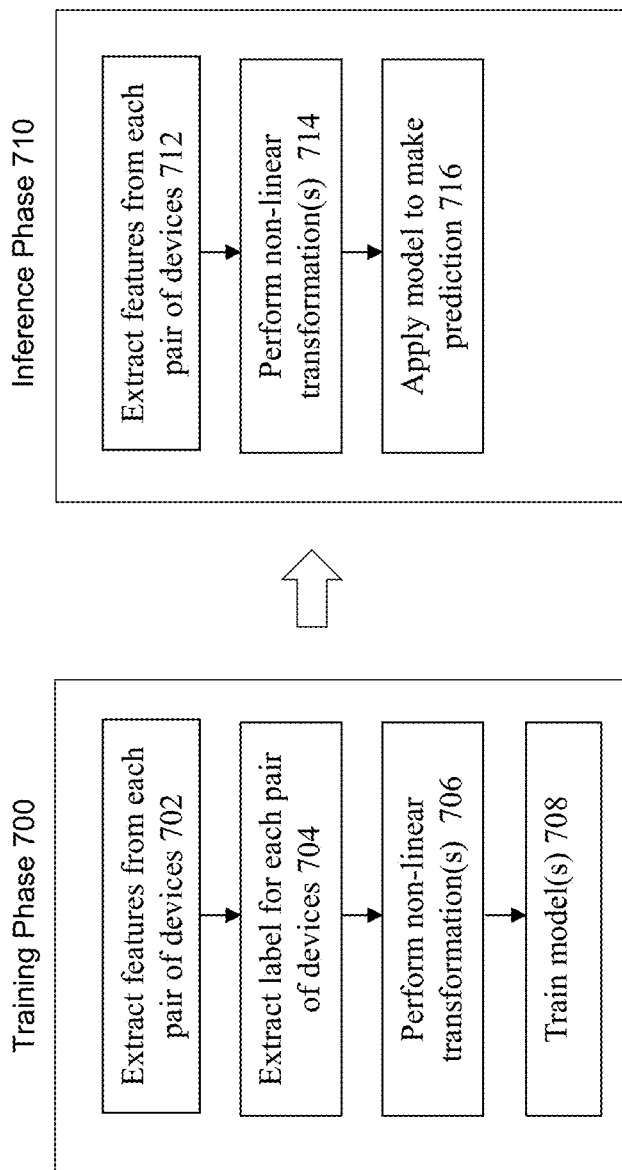
FIG. 7 provides an illustration of an approach to implement predictions for the same-row problem according to some embodiments of the invention.

FIG. 7 provides an illustration of an approach to implement predictions for the same-row problem according to some embodiments of the invention. In particular, the process flow operates in two phases, including a training phase 700 that operates upon both the schematic and layout of previous designs which are provided to the system as training data. The second phase is an inference phase 710 where the model learned from training is applied to the schematic of a new design.

In the training phase, at 702, features are extracted from each pair of devices. At 704, labels are also extracted for each pair of devices. In some embodiments, the following features extracted from the schematic data: (a) Connectivity; (b) Schematic position; (c) Device size; (d) Orientation; and/or (e) Device type. The specific steps to extract the features were described in the previous sections of this disclosure.

While certain elements of the feature data may be directly used by the machine learning system (e.g., connectivity), at 706, other features may require feature transformation to make the machine learning system more accurate.

To explain, consider that the schematic position of devices tend to have good correlation with the position in layout. However, directly using the schematic positions $(x_1, y_1)$ and $(x_2, y_2)$ as features does not work with a simple classifier because there is no linear dependency. Therefore, feature transformation is performed for this data for better accuracy in some embodiments. In this situation, the transformed feature is implemented as follows with the following non-linear transformation:

$$x\mathrm{diff}=\mathrm{abs}(x_1-x_2)$$

$$y\mathrm{diff}=\mathrm{abs}(y_1-y_2)$$

These features are 0 when two devices are in the same column/row, and increase with the x/y distance. It is noted that at least ydiff is a very strong feature in indicating same row relationships.

As another example, consider symmetry features, where the symmetry features correspond to a measurement of how much two devices look like they are in symmetric position in schematic. The transformed symmetry feature may be implemented as follows with the following transformation:

$$x\mathrm{sym}=\mathrm{abs}((x1+x2)/2-\mathrm{mean}(x))$$

$$y\mathrm{sym}=\mathrm{abs}((y1+y2)/2-\mathrm{mean}(y))$$

Here, if ydiff=0, then a small xsym tends to correlate well with devices being in the same row.

Regarding device size features, similar to position features, two devices having the similar size tend to have good correlation with being in the same row. The device size features can be transformed as follows:

$$\mathrm{finger\_diff}=\mathrm{abs}(\log(\mathrm{finger}_1)-\log(\mathrm{finger}_2))$$

$$\mathrm{fin\_diff}=\mathrm{abs}(\log(\mathrm{fin}_1)-\log(\mathrm{fin}_2))$$

$$l\_\mathrm{diff}=\mathrm{abs}(\log(l_1)-\log(l_2))$$

Here, the logarithmic function is employed in some embodiments to consider size of device 1 as being k times larger than device 2, instead of k nm larger.

Additional features may be considered for orientation difference, including a feature relating to whether orientation of two devices is the same (e.g., 1 if the same, 0 if not). The feature may also relate to whether the orientation is not the same but symmetric (e.g., 1 if the symmetric, 0 if not).

Features may also be considered as to device type difference. A "Primary type" feature may relate to whether both devices are NMOS, PMOS, etc. devices (e.g., 1 if primary type is the same, 0 if not). A "Secondary_type" feature may relate to whether the devices are the same primary type, but are different in exact device type (e.g. high voltage vs low voltage devices).

Referring back to FIG. 7, at 708, the next action is to train the models. Predictive modeling is implemented to go from observations about a set of data, to generate conclusions from that data. Any suitable approach may be taken to construct the models.

Once the training phase 700 has been completed, the inference phase 710 can be performed to generate predictions. In the inference phase, at 712, features are once again extracted for each pair of devices in the design. This time, unlike the training phase where features are extracted from both the historical schematics and historical layouts, in the inference phase the features are extracted for the pairs of devices from the schematic (since the layout is to be constructed). The features to be extracted are similar/same as the features extracted during the training phase.

Next, at 714, various transformations may be applied to one or more of the extracted features. These transformations are the same/similar to the transformations described above for step 706. Thereafter, at 716, the model(s) are applied to make predictions about whether any two devices in the schematic should be placed on the same row in the layout.

Various approaches can be taken to implement the modeling and predictive actions described in this section of the disclosure. For example, a decision tree based approach can be taken to implement classification according to some embodiments. With the decision tree, a tree structure is learned for making decisions. The learned decision tree can be implemented as a number of nested if-else statements based on the extracted features. In some embodiments, the algorithm designer only specifies which features to use and their scope, how they are used and in which order are automatically learned by the algorithm. This approach is particularly suitable if the amount of data is not large enough to apply sophisticated models such as deep learning, but where simple models such as logistic regression often cannot express important concepts adequately. For example, consider if NMOS and PMOS are never placed in the same row in the training data, but adding device type feature does not improve accuracy for logistic regression.

In some embodiments, a decision tree ensemble method, may be employed, such as the random forest or gradient boosting approaches. In the random forest approach, a random forest repeatedly learns different decision trees and reports the average result to improve the accuracy. The benefits of using an ensemble method are that the results may be more accurate and stable, and additional this approach reports the probability of the label, which is extremely useful in combining the row classification results from individual classifiers.

Layout Recommendation

After the training process is completed, a different user (such as the Layout Design Engineer) will use the trained models with the system to generate recommendations for layouts. As noted in the background section of this document, conventional EDA tools generate layout in sub-optimal ways that rely upon many user options or heuristics that cannot be correct in every situation. In embodiments of the invention, the placement of structures in a layout is based upon learned models that apply best practices and historical preferences of the users, and as such, generates more correct results with less required intervention from the user.

Figure 9:
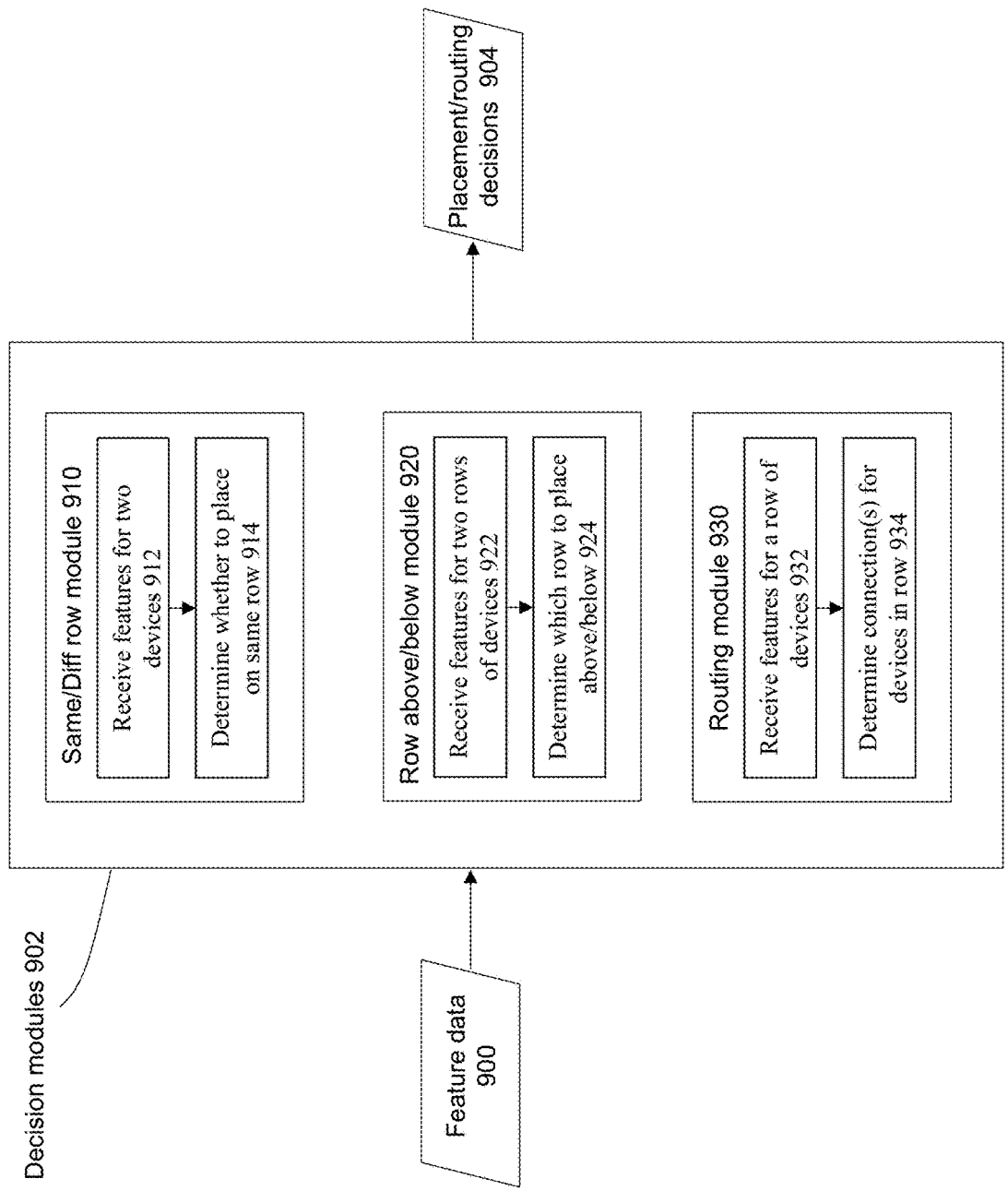
FIG. 9 illustrates an example set of decision modules.

A series of small decision modules used by the system can be used to solve the overall placement problems. As shown in FIG. 9, decisions can be made by combining multiple small decisions by the decision modules 902 based upon feature data 900. For example, module 910 determines whether certain devices should be placed on the same or different row, e.g., using the approach described in the previous section relative to FIGS. 6-7. At 912, the module 910 receives the feature data for a pair of devices, and at 914, determines whether the devices are to be placed onto the same row or a different row. Module 920 checks the relative placement of two rows of devices. At 922, module 920 receives feature data for two rows of devices, and at 924, determines which of the rows is placed above/beneath the other row. Module 930 pertains to routing decisions for a row, where at 932 the module 930 receives features of a row of devices, and at 934 determines configuration information for connecting devices in the row. This decision module inputs features of the current row and outputs a most probable routing given the history the system was trained on. It is noted that these modules are merely illustrative of decision modules that may be implemented, and other types of decision modules may also be used in various contemplated embodiments of the invention.

Figure 8:
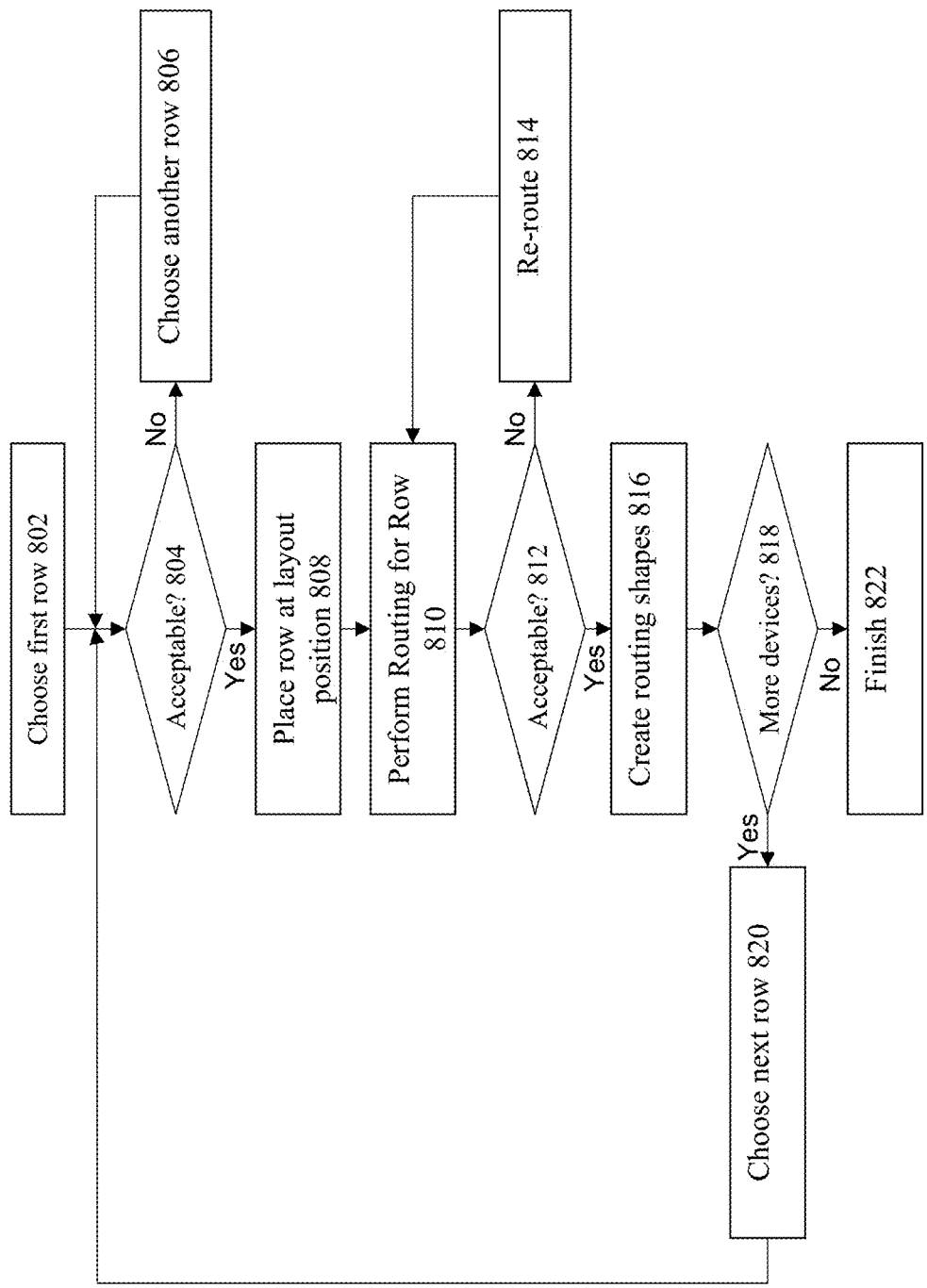
FIG. 8 illustrates a flowchart of a process for recommending a layout.

As shown in FIG. 8, machine learning is employed to guide the user through building of placements that is similar to placements that the system was trained on. At 802, a determination is made of the first (e.g., bottom row) in the design. This can be implemented by identifying the most probable row from devices connected to ground, e.g., using the appropriate decision module from FIG. 9. At 804, a determination is made whether the chosen row is acceptable to the user. If not, then at 806, another row is chosen and the process loops back to 504.

At 808, a row is placed at the next layout position, e.g., starting from the bottom of the layout. Next, at 810, a probable first-level routing is identified for the row. The appropriate decision module(s) from FIG. 9 can be employed to implement these steps. At 812, a determination is made whether the identified routing is acceptable to the user. If not, then at 814, the next most probable routing is chosen and the process loops back to 812. If acceptable, then at 816, the routing shapes are created, e.g., by creating the geometries of the routing structures for the track(s) of routing that were approved by the user.

The process then makes a determination, at 818, whether there are any additional devices to place in the layout. If so, then at 820, the next most probable row is selected, e.g., for devices "above" the previous row. The process then loops back to 804 and continues as described above. However, if there are no further devices to process, then the process ends at 822.

Therefore, this approach implements placement of structures in a layout is based upon learned models that apply best practices and historical preferences of the users, and as such, generates more correct results with less required intervention from the user. Throughout the process the user is consulted to confirm the placement is progressing as expected. During or after the process of creating a row additional information can be added to make the row more complete. For example, the exact ordering, exact spacing, small vertical offsets and other physical properties of the row can be determined using different small decision modules. At multiple points in the process the user has the option to reject the first recommendation of the system. When this occurs the system simply updates the recommendation to the next most likely. When all devices are placed the system completes and the layout is passed to a finishing stage where additional geometry such as rings, dummies, taps, fill, and routing are added. The additional stage may leverage existing EDA capabilities with the opportunity to apply similar machine learning based techniques in the future.

In effect, the present approach leverages structures present in advance node placement to decompose the construction of a good layout into many smaller decisions that were used to construct that layout. By leveraging machine learning based decision modules most of the placement is constructed as the user would wish with minimal user input/interaction. The user is not required to specify many options, write code or long descriptions of how the placement should look. As each recommender gives probabilistic recommendations (e.g. the answer to should these two instances be placed in the same row is not yes or no, it is: 90.3% yes/9.7% no, and—the system is chaining these recommendations together), this permits the system to provide multiple recommendations with different confidence levels. The user's selection to the multiple recommendations can be fed back into the models (e.g., using online learning) to update future recommendations.

This approach therefore provides numerous advantages over conventional implementations that rely on many options or some heuristic that cannot be correct in every situation. In the current approach, the final placement resembles the placements that the decision modules were trained on. Since the inventive system uses the decision modules and the structure found in advanced node placements, one can produce better placements with less user interaction. This is because the notion of a "better" placement is encoded in the decision modules which are consulted when building a placement.

System Architecture Overview

Figure 10:
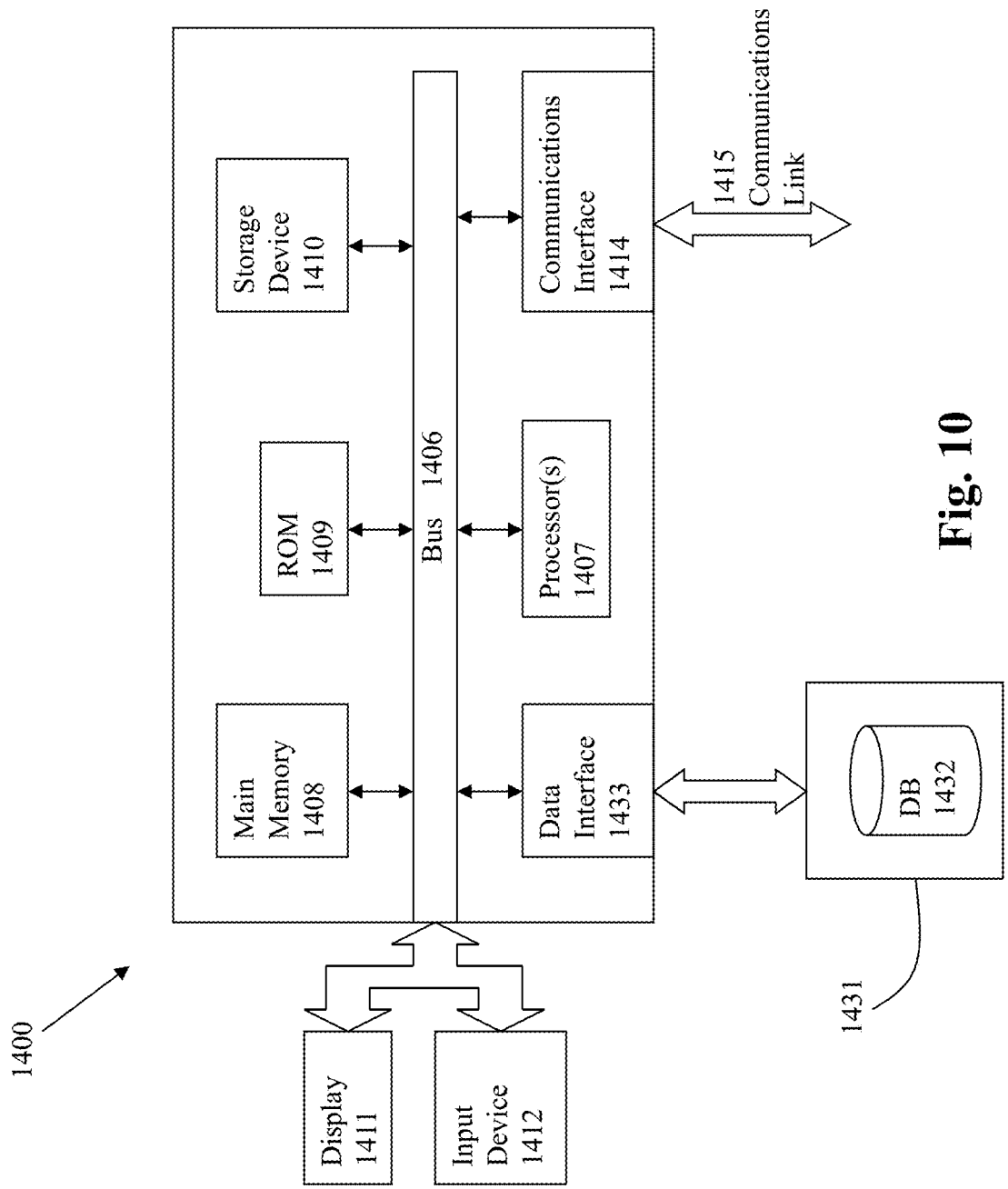
FIG. 10 is a block diagram of an illustrative computing system suitable for implementing an embodiment of the present invention.

FIG. 10 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), storage device 1410 (e.g., magnetic or optical), communication interface 1414 (e.g., modem or Ethernet card), display 1411 (e.g., CRT or LCD), input device 1412 (e.g., keyboard, and cursor control).

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or storage device 1410. In alternative embodiments, hardwired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, e.g., application code, through communication link 1415 and communication interface 1414. Received program code may be executed by processor 1407 as it is received, and/or stored in storage device 1410, or other non-volatile storage for later execution. Computer system 1400 may communicate through a data interface 1433 to a database 1432 on an external storage device 1431.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method, comprising:
    loading electronic designs, the electronic designs comprising historical circuit schematics and corresponding historical physical layouts;
    implementing a machine learning process, wherein the machine learning process generates a plurality of different trained predictors from features and labels in the electronic designs, the plurality of different trained predictors for generating predictions to a plurality of routing steps, by:
        extracting features from historical circuit schematics and historical physical layouts in the electronic designs;
        extracting labels from the historical circuit schematics and the historical physical layouts in the electronic designs; and
        training a plurality of different predictors from different combinations of the features and the labels; and
    generating a recommended physical layout for a circuit schematic of a new electronic design using two or more of the plurality of different trained predictors generated using the machine learning process.

2. The method of claim 1, wherein the features and labels correspond to a trained model, the trained model combined with user parameters to form the plurality of different trained predictors.

3. The method of claim 1, wherein the plurality of different predictors are partially trained using a common set of historical circuit schematics and a common set of historical physical layouts, and the plurality of different predictors are further trained using user specific circuit schematics and user specific historical physical layouts, the common set of historical circuit schematics and the common set of historical physical layouts being used for training predictors for a plurality of users, and the user specific circuit schematics and the user specific historical physical layouts being used only for the respective user.

4. The method of claim 1, wherein the features are extracted for pairs of devices in the electronic designs, the labels are extracted for the pairs of devices, and at least one of the plurality of different trained predictors generate a recommendation pertaining to whether a pair of devices are placed on a same row in a physical layout.

5. The method of claim 1, wherein a non-linear transformation is performed on a feature or a label.

6. The method of claim 1, further comprising:
   (a) selecting a row comprising a plurality of devices;
   (b) placing the row at a physical layout position using at least one of the plurality of different trained predictors;
   (c) creating routing shapes for the row; and
   (d) repeating (a)-(c) when there are more devices to place.

7. The method of claim 1, wherein feature data is processed by a decision module that determines at least one of (a) whether to place devices on a same row; (b) which row to place above or below another row; or (c) connections for devices in a row.

8. A computer program product embodied on a non-transitory computer readable medium, the computer readable medium having stored thereon a sequence of instructions which, when executed by a processor cause a set of acts, the set of acts comprising:
   loading electronic designs, the electronic designs comprising historical circuit schematics and corresponding historical physical layouts;
   implementing a machine learning process, wherein the machine learning process generates a plurality of different trained predictors from features and labels in the electronic designs, the plurality of different trained predictors for generating predictions to a plurality of routing steps, by:
      extracting features from historical circuit schematics and historical physical layouts in the electronic designs;
      extracting labels from the historical circuit schematics and the historical physical layouts in the electronic designs; and
      training predictors from different combinations of the features and the labels; and
   generating a recommended physical layout for a circuit schematic of a new electronic design using two or more of the plurality of different trained predictors generated using the machine learning process.

9. The computer program product of claim 8, wherein the features and labels correspond to a trained model, the trained model combined with user parameters to form the plurality of different trained predictors.

10. The computer program product of claim 8, wherein the predictors are partially trained using a common set of historical circuit schematics and a common set of historical physical layouts, and the predictors are further trained using user specific circuit schematics and user specific historical physical layouts, the common set of historical circuit schematics and the common set of historical physical layouts being used for training predictors for a plurality of users, and the user specific circuit schematics and the user specific historical physical layouts being used only for the respective user.

11. The computer program product of claim 8, wherein the features are extracted for pairs of devices in the electronic designs, the labels are extracted for the pairs of devices, and at least one of the plurality of different trained predictors generate a recommendation pertaining to whether a pair of devices are placed on a same row in a physical layout.

12. The computer program product of claim 8, wherein a non-linear transformation is performed on a feature or a label.

13. The computer program product of claim 8, wherein the set of acts further comprise:
   (a) selecting a row comprising a plurality of devices;
   (b) placing the row at a physical layout position using at least one of the plurality of different trained predictors;
   (c) creating routing shapes for the row; and
   (d) repeating (a)-(c) when there are more devices to place.

14. The computer program product of claim 8, wherein feature data is processed by a decision module that determines at least one of (a) whether to place devices on a same row; (b) which row to place above or below another row; or (c) connections for devices in a row.

15. A system for implementing design data for electronic designs, comprising:
   a memory for storing a sequence of instructions; and
   a processor that executes sequence of instructions to cause a set of acts, the set of acts comprising:
      loading electronic designs, the electronic designs comprising historical circuit schematics and corresponding historical physical layouts;
      implementing a machine learning process, wherein the machine learning process generates a plurality of different trained predictors from features and labels in the electronic designs, the plurality of different trained predictors for generating predictions to a plurality of routing steps, by:
         extracting features from historical circuit schematics and historical physical layouts in the electronic designs;
         extracting labels from the historical circuit schematics and the historical physical layouts in the electronic designs; and
         training a plurality of different predictors from different combinations of the features and the labels; and
      generating a recommended physical layout for a circuit schematic of a new electronic design using two or more of the plurality of different trained predictors generated using the machine learning process.

16. The system of claim 15, wherein the features and labels correspond to a trained model, the trained model combined with user parameters to form the plurality of different trained predictors.

17. The system of claim 15, wherein the plurality of different predictors are partially trained using a common set of historical circuit schematics and a common set of historical physical layouts, and the plurality of different predictors are further trained using user specific circuit schematics and user specific historical physical layouts, the common set of historical circuit schematics and the common set of historical physical layouts being used for training predictors for a plurality of users, and the user specific circuit schematics and the user specific historical physical layouts being used only for the respective user.

18. The system of claim 15, wherein the features are extracted for pairs of devices in the electronic designs, the labels are extracted for the pairs of devices, and at least one of the plurality of different trained predictors generate a recommendation pertaining to whether a pair of devices are placed on a same row in a physical layout.

19. The system of claim 18, wherein a non-linear transformation is performed on a feature or a label.

20. The system of claim 15, wherein the set of acts further comprise:
 (a) selecting a row comprising a plurality of devices;
 (b) placing the row at a physical layout position using at least one of the plurality of different trained predictors;
 (c) creating routing shapes for the row; and
 (d) repeating (a)-(c) when there are more devices to place.

* * * * *